United States Patent [19]

Kessler et al.

[11] 4,393,978
[45] Jul. 19, 1983

[54] REUSABLE CONTAINER CLOSURE CAP

[75] Inventors: Milton Kessler, Youngstown; Myron E. Ullman, Jr., Canfield, both of Ohio

[73] Assignee: Kessler Products Co., Inc., Youngstown, Ohio

[21] Appl. No.: 390,327

[22] Filed: Jun. 21, 1982

Related U.S. Application Data

[62] Division of Ser. No. 182,628, Aug. 29, 1980, Pat. No. 4,354,610.

[51] Int. Cl.³ .............................................. B65D 41/34
[52] U.S. Cl. .................................................... 215/253
[58] Field of Search ............... 215/253, 254, 330, 252, 215/213, 214, 216, 221; 220/270

[56] References Cited

U.S. PATENT DOCUMENTS

| | | | |
|---|---|---|---|
| 2,643,015 | 6/1953 | Soffer | 215/253 |
| 3,025,989 | 3/1962 | Williams | 215/252 |
| 3,612,323 | 10/1971 | Malick | 215/214 |
| 4,209,101 | 6/1980 | Brown | 215/253 |
| 4,326,639 | 4/1982 | Stahl et al. | 215/252 |

Primary Examiner—Donald F. Norton
Attorney, Agent, or Firm—David A. Burge

[57] ABSTRACT

A closure cap particularly suited for use with containers such as milk bottles includes multiple sealing areas as well as frangible locking means. The locking means is located near the lower rim of a skirt portion of the closure cap. If the locking means has not been tampered with, an interlocking engagement between the locking means and a complementary portion of the container retains the cap on the container. If the locking means has been tampered with, the cap can be removed from the container. A visual inspection of the closure cap readily indicates whether the locking means is in tampered or untampered condition. In one embodiment, the cap can be repeatedly snapped into place on the container, and in other alternative embodiments, the cap can be repeatedly threaded onto the container. The multiple sealing areas not only seal the contents of the container, but one of the areas also prevents dust, dirt, or other contaminants from having access to the other sealing areas.

5 Claims, 9 Drawing Figures

REUSABLE CONTAINER CLOSURE CAP

CROSS REFERENCE TO RELATED APPLICATION

This is a division of application Ser. No. 182,628 filed Aug. 29, 1980, now U.S. Pat. No. 4,354,610.

BACKGROUND OF THE INVENTION

1. Field of the Invention

The invention relates to closure caps for containers and, more particularly, to a reusable closure cap for containers having multiple sealing zones and a frangible locking means which can visually indicate whether the container has been opened.

2. Description of the Prior Art

Closure caps having a tamperproof feature have become an important item of commerce. Generally speaking, closure caps of this class include a locking member of some kind which interacts with a locking member included as part of a container. Upon breaking of the closure cap locking member, the cap can be removed from the container. Desirably, the closure cap locking member can be inspected visually to determine whether it has been tampered with. Accordingly, a consumer can readily detect whether the container has been opened previously.

Although container closures of this general class can function effectively, certain problems have not been addressed. One of these problems relates to reusability of the closure cap. With many closure caps made of a plastics material or metal foil, a so-called tear tab is pulled when it is desired to remove the closure cap from the container. Rupture zones often are provided in order to permit the tab to be torn easily. Sometimes the tab tears completely through the side wall of the cap and into the top wall of the cap. When this occurs, either by design or by accident, it is easy to remove the cap from the container, but the cap cannot be reused to seal the container again.

In an attempt to avoid the foregoing problem, container closure caps having tear tabs which do not enter the top wall of the cap have been provided. Certain of these caps are not reusable because, during the opening process, a skirt portion of the cap is sufficiently weakened that a good sealing function no longer can be carried out. Other caps are known in which a small locking member in the skirt portion of the cap is broken, either to permit removal of the cap or upon removal of the cap, but these caps also suffer certain drawbacks with respect to sealing capabilities.

Particularly when sealing a container containing a substance such as milk, it is quite important that the sanitary condition of the milk be maintained. In addition to at least one primary sealing area, it is desirable to provide a so-called bug shield in order to prevent dust, dirt, small insects, and so forth from having access even to the primary sealing area. Known container closures for milk containers either do not have a bug shield or are expensive to manufacture. Desirably, a closure cap for a milk container would be inexpensive to manufacture, easy to detect whether it had been opened previously, would adequately shield the primary sealing area from contamination, and would have desirable qualties of appearance.

Other types of containers are best sealed by a threaded closure cap. Prior threaded closure caps having tear tabs have not performed particularly well and tear tabs generally have been avoided with threaded caps. One known threaded closure cap not employing a tear tab is usable repeatedly, but it is made of relatively thick metal and it is difficult to initially untwist the cap from the container. In another known closure cap made of a plastics material, a so-called tear ring is disposed about the lower periphery of the cap. The tear ring includes serrations which engage mating serrations formed on the outer surface of the container. When it is desired to remove the cap, the tear ring is ripped from the cap and thrown away. Thereafter, the cap can be unthreaded because the mating serrations no longer prevent removal of the cap.

A problem with the foregoing construction is that it sometimes is difficult to grasp the tear ring in order to expeditiously remove it. Moreover, it is difficult to manufacture the cap such that the tear ring is connected to the remainder of the cap with material of the proper thickness. That is, a circumferential line of weakness between the tear ring and the remainder of the cap must be provided, and it is difficult to form such a line of weakness in a molding operation without ripping the tear ring from the closure cap upon removal of the cap from the mold.

SUMMARY OF THE INVENTION

The present invention overcomes the foregoing and other drawbacks in prior art proposals providing a novel and improved container closure suitable for use with containers such as milk bottles. The container closure includes multiple sealing zones as well as frangible locking means. The locking means, in untampered condition, locks the cap onto the container and, in tampered condition, permits the cap to be removed from the container. The locking means can be readily inspected by observation to determine if the container has been opened previously.

The closure cap includes a disc-like top wall from which an annular skirt depends. The top wall provides a primary sealing area for the container. The skirt includes, on its inner surface, a first wall portion conforming generally to the outer contour of a first wall portion of the container. The skirt also includes a locking member engageable with a locking member included as part of the container, as well as a second wall portion. In one embodiment of the invention, the second wall portion of the closure cap seals against a shoulder portion of the container to prevent dirt or other contaminants from having access to the primary sealing area. In this embodiment of the invention, the locking member also performs a sealing function.

In another embodiment of the invention, the first wall portion of the skirt includes threads which mate with complementary threads formed on the container. A locking member included as part of the closure cap engages a locking member on the container. In this embodiment of the invention, the locking member of the closure cap is part of the second wall portion of the cap. In yet another "threaded" embodiment of the invention, the locking member is serrated and is engageable with serrations formed on the outer surface of the container.

In each embodiment of the invention, spaced, vertically extending rupture zones extend from the lower rim of the skirt toward the top wall of the cap. The rupture zones do not extend into the top wall. A flexible tab extends laterally outwardly of the skirt from a location near the lower rim of the skirt. Upon flexure of the tab, the rupture zones will fail, thereby permitting the skirt to expand circumferentially near the lower rim of the skirt. In turn, the locking members will be disengaged, thus permitting the cap to be removed from the container.

In the first-mentioned embodiment of the invention, the cap can be reused repeatedly simply by snapping the cap onto the container. In this embodiment the second wall portion of the cap provides an effective "bug shield" prior to initial opening of the container. In the second and third-mentioned embodiments, the threaded portion of the cap permits the cap to tightly seal the container, and yet the flexible tab does not interfere with that function, even after the cap has been opened. All embodiments of the invention can be formed expeditiously in a molding operation, and the particular construction and arrangement of elements minimizes tolerances required during the molding operation.

The foregoing and other features and advantages, and a fuller understanding of the invention, may be had by referring to the following description and claims, taken in conjunction with the accompanying drawings.

DESCRIPTION OF THE PREFERRED EMBODIMENT

Figure 1:
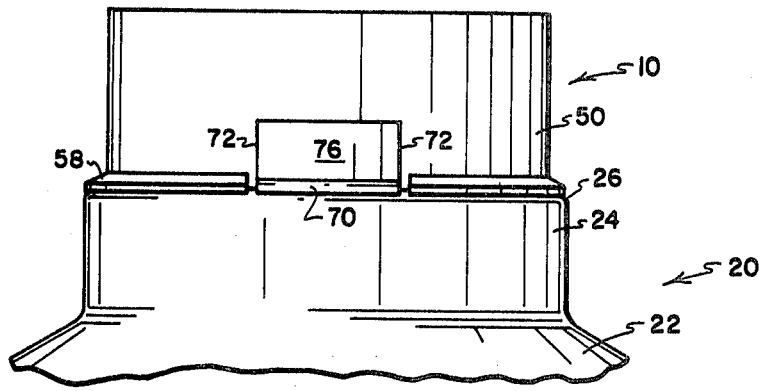
FIG. 1 is a side elevational view of one embodiment of the invention and especially adapted for use with milk containers.
Figure 2:
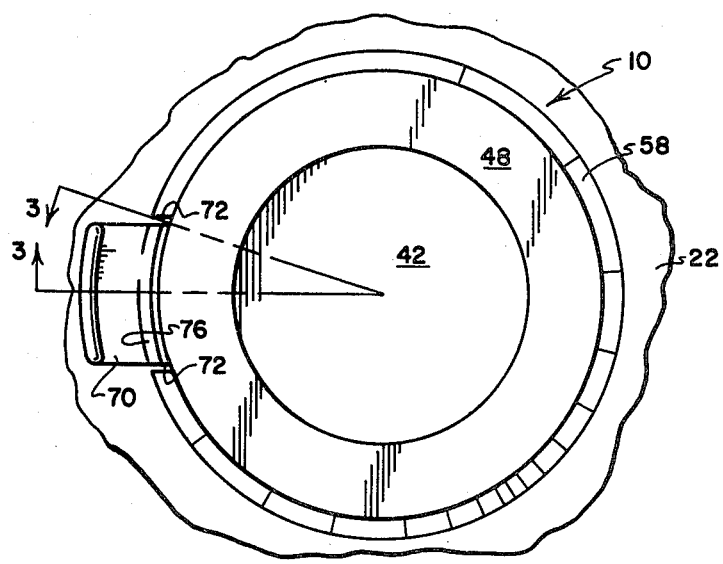
FIG. 2 is a plan view of the container closure of FIG. 1.
Figure 3:
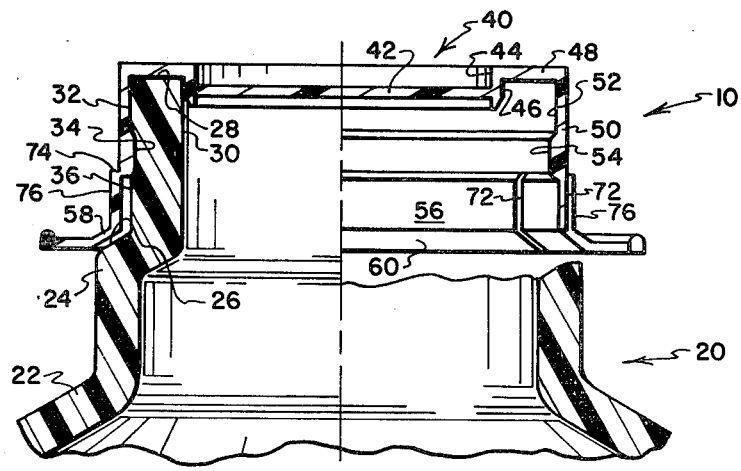
FIG. 3 is a view taken along a plane indicated by line 3—3 in FIG. 2, with portions of the container broken away and removed for clarity.

As used herein, such terms as "vertically," "downwardly," "upper" and the like are intended to indicate the relative position of certain elements of the invention with respect to each other and no particular spatial orientation of the invention is required or is to be presumed from the use of these terms. Referring to FIGS. 1–3, a container closure cap according to the invention is indicated generally by the numeral 10. The closure cap 10 is formed in a molding operation from a plastics material such as high density polyethylene. The cap 10 is shown in sealing position atop a container 20. The container 20 is in the form of a typical milk bottle having a large body portion 22 and a generally cylindrical neck portion 24 having a tapered shoulder portion 26. The container 20 typically is formed in a blow-molding operation from a suitable plastics material.

The neck portion 24 includes an annular rim 28 having a generally flat upper surface. The neck portion 24 includes a cylindrical inner surface 30 extending the length of the neck portion 24. The neck portion 24 also includes a first wall portion 32 immediately adjacent the rim 28. The first wall portion 32 is smooth-sided and cylindrical. A first locking member 34 is positioned vertically adjacent the first wall portion 32 on the outer surface of the neck portion 24. The first locking member 34 is in the form of a cylindrical groove having a diameter smaller than that of the first wall portion 32. A second wall portion 36 is located vertically adjacent the first locking member 34 and provides a transition between the neck portion 24 and the shoulder portion 26. The second wall portion 36, like the first wall portion 32, is cylindrical and smooth-sided. The second wall portion 36 is approximately the same diameter as the first wall portion 32.

The closure cap 10 includes a disc-like top wall 40 having a center section 42 slightly smaller in diameter than the inner diameter of the neck portion 24. A ledge 44 extends upwardly from the outer edge of the center section 42, and a rim 46, beveled on its outer surface, extends from the periphery of the center section 42 in a direction opposite to that of the ledge 44. A flange 48 extends laterally outwardly from the ledge 44 and overlies the rim 28.

An annular skirt 50 depends from the top wall 40. The skirt 50 extends downwardly from the outer periphery of the flange 48. The skirt 50 includes, on its inner surface, a third wall portion 52. The third wall portion 52 is smooth-sided and conforms generally to the contour of the first wall portion 32. A second locking member 54 is located vertically adjacent the third wall portion 52. The second locking member 54 is in the form of an inwardly projecting rim engageable with the first locking member 34. A fourth wall portion 56 is located vertically adjacent the second locking member 54 and extends to a lower rim 58 of the skirt 50. The fourth wall portion 56 is smooth-sided and conforms generally to the contour of the second wall portion 36. The lower rim 58 is flared outwardly on its inner surface as at 60. When the closure cap 10 is in sealing position atop the container 20, the inner surface 60 is in surface-to-surface contact with the shoulder portion 26.

The closure cap 10 also includes a flexible tab 70 extending laterally outwardly from the lower rim 58. A pair of spaced, vertically extending rupture zones, or lines 72 extend from the lower rim 58 to a point intermediate the lower rim 58 and the top wall 40. The rupture lines 72 are connected at their upper end by a hinge line 74. The lines 72, 74 essentially are areas of reduced material thickness (approximately 0.008 inch). As can be seen in FIGS. 2 and 3, a wall section 76 is bounded by the lines 72, 74 and is located slightly laterally outwardly of the outer diameter of the fourth wall portion 56. The tab 70 is an extension of the lower portion of the wall section 76. Upon upward flexure of the tab 70, the rupture zones 72 will fail and the wall section 76 will be pivoted about the hinge line 74.

During initial assembly of the closure cap 10 atop the container 20, the cap 10 is placed atop the neck portion 26 and a compressive force is applied uniformly to the flange 48. After enough force has been applied, the second locking member 54 will be slightly expanded, and the first wal portion 32 either will remain dimensionally stable or will be reduced in diameter slightly. Although an interference fit is created, the relative dimensions of the cap 10 and the neck portion 24 are such that the cap 10 will be able to be moved axially into that position shown in FIGS. 1–3. After the cap 10 is in that position illustrated in the FIGURES, the container 20 will be sealed. Several sealing areas are provided:

1. The interface between the upper, inner portion of the neck portion 24 and the rim 46.
2. The interface between the upper surface of the rim 28 and the underside of the flange 48.
3. The interface between the first wall portion 32 and the third wall portion 52.
4. The engagement between the first and second locking members 34, 54.
5. The interface between the shoulder portion 26 and the inner surface 60 of the lower rim 58.

The first three sealing areas may be referred to collectively as a primary seal. The fourth sealing area may be referred to as a secondary seal. The fifth sealing area has been referred to previously and may be identified as a tertiary seal. The surface-to-surface contact between the shoulder portion 26 and the inner surface 60 effectively functions as a "bug seal" to prevent dirt, dust, and other contaminants from reaching the other sealing areas.

In order to remove the closure cap 10 from the container 20, the tab 70 is lifted upwardly until the rupture zones 72 fail. At that point, the hoop strength in the lower portion of the skirt 50 is released. Under these circumstances, axial force can be applied to the cap 10 and, because the lower portion of the skirt 50 now can be expanded circumferentially, the first and second locking members 34, 54 can be disengaged relatively easily. In turn, the cap 10 can be removed from the container 20. After the rupture zones 72 have failed, the cap 10 can be removed and replaced as often as desired without adversely affecting the primary and secondary sealing areas. Because the tab 70 and the wall section 76 are readily observable by a consumer, it will be immediately apparent whether the cap 10 has been tampered with or removed from the container 20. Unlike certain prior art closure caps, the closure cap 10 according to the invention is relatively easy to open because the tab 70 can be grasped without difficulty, and there is no need to dispose of a severed portion of the cap 10.

Figure 4:
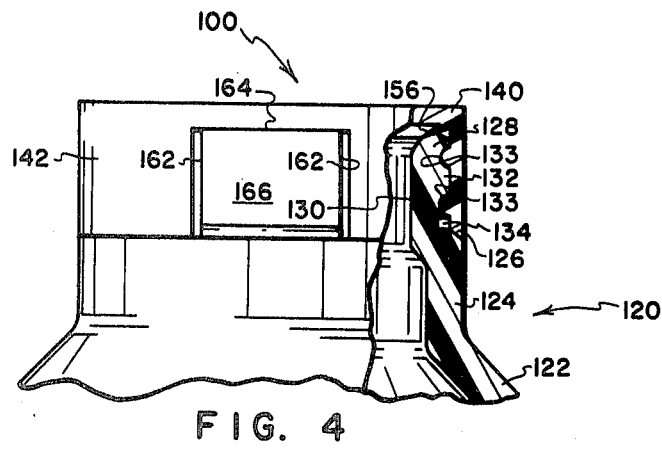
FIG. 4 is a side elevational view of an alternative embodiment of the invention, with a portion of a cap and container being shown in cross-section.
Figure 5:
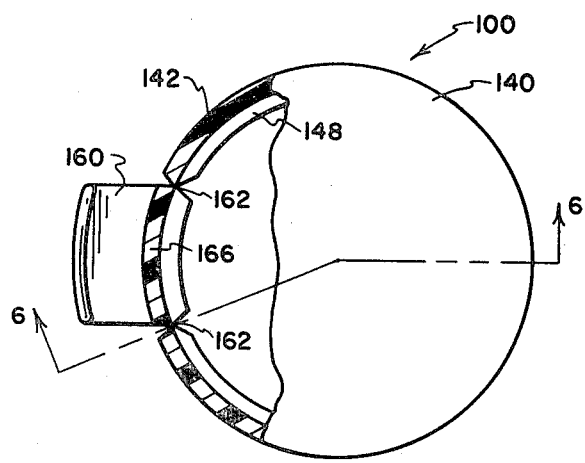
FIG. 5 is a plan view of the container closure of FIG. 4 with a portion of the cap being shown in cross-section.
Figure 6:
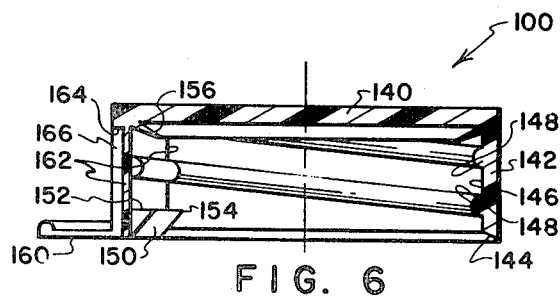
FIG. 6 is a view taken along a plane indicated by line 6—6 in FIG. 5.

An alternative closure cap according to the invention is indicated in FIGS. 4–6 by the numeral 100. The cap 100 is suitable for use with containers having threaded neck portions. The cap 100 also can be used for sealing containers having relatively high internal pressures.

The cap 100 is illustrated in sealing position atop a container 120. The container 120 includes a relatively large body portion 22, and a generally cylindrical, elongate neck portion 124 having a tapered shoulder portion 126. The neck portion 124 includes an annular rim 128 having a rounded upper surface. The neck portion 124 includes a cylindrical inner surface 130 extending the length of the neck portion 124. The neck portion 124 also includes a first wall portion 132 having a plurality of helical grooves 133 on its outer surface. The grooves 133 function as a locking member. Another locking member 134 is positioned vertically adjacent the first wall portion 132 on the outer surface of the neck portion 124. The locking member 134 is in the form of an annular groove having a diameter smaller than that of the first wall portion 132.

The closure cap 100 includes a disc-like top wall 140. An annular skirt 142 depends from the top wall 140. The skirt 142 extends downwardly from the outer periphery of the top wall 140 and terminates in a beveled lower rim 144. The skirt 142 includes, on its inner surface, a second wall portion 146. The second wall portion 146 includes a plurality of threads 148 which interlock with the grooves 133 on the first wall portion 132 and thereby function as another locking member.

An additional locking member 150 is located near the lower rim 144 of the skirt 142. In effect, the locking member 150 is part of the second wall portion 146. The locking member 150 is in the form of an inwardly extending projection, or tooth, engageable with the first locking member 134. The tooth 150 includes a flat upper surface 152 and a sharp inner edge 154.

An inwardly extending, flexible annular lip 156 is positioned at the interface between the top wall 140 and the skirt 142. In use, upon applying the cap 100 to the container 120, the lip 156 engages the rim 128 to effect a fluid-tight seal. The engagement between the lip 156 and the rim 128 may be referred to as a primary seal. The interlocking grooves and threads 133, 148 of the wall portions 132, 146 create a secondary seal. The rim 144 and the shoulder 126 engage each other in substantial surface-to-surface contact to create a tertiary seal.

The closure cap 100 also includes a flexible tab 160 extending laterally outwardly from the lower rim 144. A pair of spaced, vertically extending rupture zones, or lines 162 extend from the lower rim 144 to a point near the top wall 140. The rupture lines 162 are connected at their upper end by a hinge line 164. The lines 162, 164 essentially are areas of reduced material thickness (approximately 0.008 inch). As can be seen in FIGS. 5 and 6, a wall section 166 is bounded by the lines 162, 164 and constitutes a continuation of the outer diameter of the skirt 142. Upon upward flexure of the tab 160, the rupture lines 162 will fail and the wall section 166 will be pivoted about the hinge line 164.

During initial attachment of the closure cap 100 to the container 120, the cap 100 is placed atop the neck portion 124 and is threaded onto the neck portion 124. As the cap 100 is threaded, the tooth 150 will engage the grooves 133 of the wall portion 132. The skirt 142 will be expanded slightly out-of-round, and the first wall portion 132 either will be dimensionally stable or will be reduced in diameter slightly. Although an interference fit is created, the relative dimensions of the cap 100 and the neck portion 124 are such that the cap 100 be able to be moved axially to that position shown in FIGS. 4–6. After the cap 100 is in that position illustrated in the FIGURES, the container 120 will be sealed and the cap 100 cannot be removed because of the engagement of the flat upper surface 152 with the groove 134.

In order to remove the closure cap 100 from the container 120, the tab 160 is lifted upwardly until the rupture zones 162 fail. At that point, the hoop strength in the lower portion of the skirt 142 is released. Also, because the tooth 150 no longer engages the groove 134, a locking function no longer is carried out by the tooth 150 and the groove 134. Accordingly, the cap 100 can be unthreaded from the container 120. Because the wall section 166 constitutes only a small circumferential portion of the skirt 142, the skirt wll not be expanded excessively upon re-tightening the cap 100 so as to disengage the grooves 133 and the threads 148. Furthermore, the cap 100 can be removed and replaced as often as desired without adversely affecting the seal created by the lip 156 and the rim 128. Because the tab 160 and the wall section 166 can be readily observed by a consumer, it will be immediately apparent whether the cap 100 has been tampered with or removed from the container 120. Moreover, the closure cap 100 according to the invention is relatively easy to open because the tab 160 can be grasped without difficulty, and there is no need to dispose of a severed portion of the cap 100.

Figure 7:
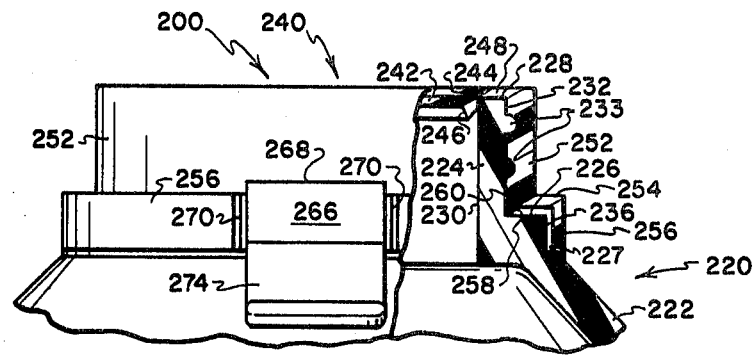
FIG. 7 is a side elevational view of an alternative embodiment of the invention, with a portion of a cap and container being shown in cross-section.
Figure 8:
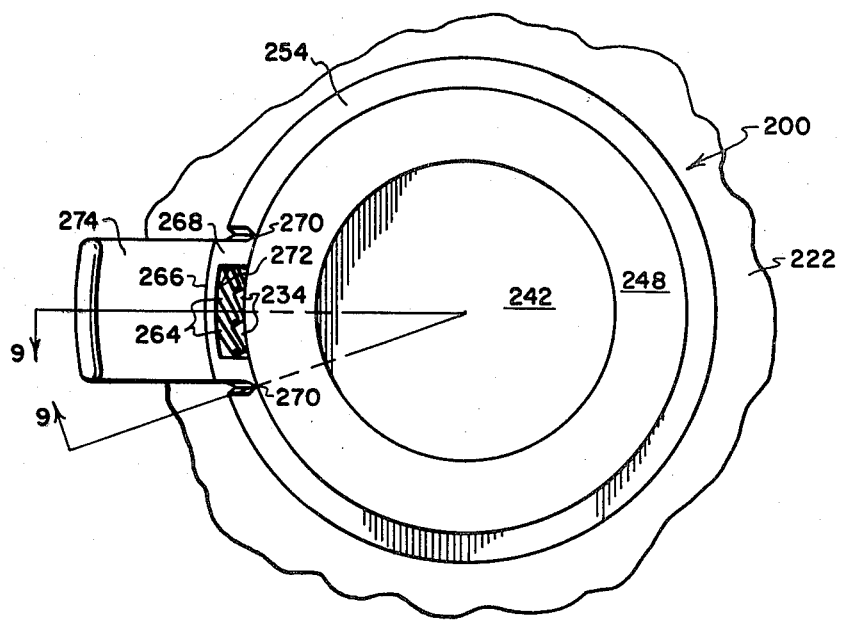
FIG. 8 is a plan view of the container closure of FIG. 7.
Figure 9:
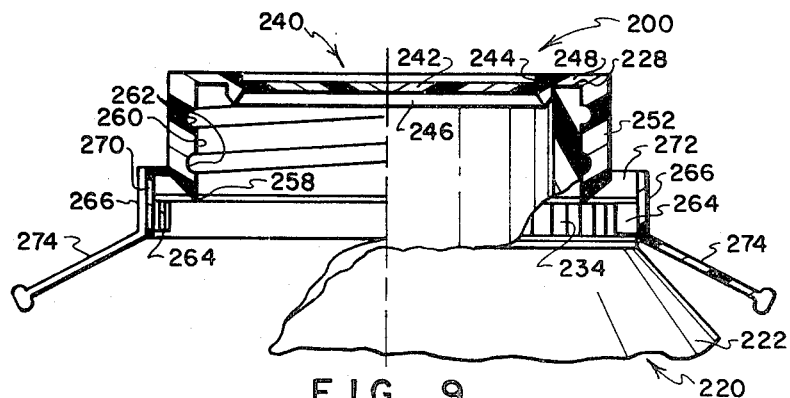
FIG. 9 is a view taken along a plane indicated by line 9—9 in FIG. 8.

A third alternative closure cap according to the invention is indicated in FIGS. 7-9 by the numeral 200. The cap 200, like the cap 100, is suitable for use with containers having threaded neck portions. The cap 100 also can be used for sealing containers having relatively high internal pressures.

The cap 200 is illustrated in sealing position atop a container 220. The container 220 includes a relatively large body portion 222, and a generally cylindrical, elongate neck portion 224 having annular ledge portions 226, 227. The neck portion 224 includes an annular rim 228 having a flattened upper surface. The neck portion 224 includes a cylindrical inner surface 230 extending the length of the neck portion 224. The neck portion 224 also includes a first wall portion 232 having a plurality of helical threads 233 on its outer surface. The threads 233 function as a locking member. Another locking member 234 is positioned vertically adjacent the first wall portion 232 on the outer surface of the neck portion 224. The locking member 234 is in the form of serrations spaced circumferentially of the neck portion 224. The serrations 234 do not extend completely about the circumference of the neck portion 224, but are located at pre-determined circumferential locations where a locking function needs to be carried out. Those circumferential locations not including serrations 234 are occupied by vertically extending walls 236. As seen in FIG. 7, the walls 236 connect the ledges 226, 227.

The closure cap 200 includes a disc-like top wall 240 having a center section 242 slightly smaller in diameter than the inner diameter of the neck portion 224. A ledge 244 extends upwardly from the outer edge of the center section 42, and a rim 246, beveled on its outer surface, extends from the periphery of the center section 242 in a direction opposite to that of the ledge 244. A flange 248 extends laterally outwardly from the ledge 244 and overlies the rim 228.

An annular skirt 252 depends from the top wall 240. The skirt 252 extends downwardly from the outer periphery of the top wall 240 and includes a laterally extending ledge 254 from which a wall 256 extends downwardly. A rim 258, beveled on its outer surface, extends downwardly from the skirt 252 at the inner periphery of the skirt 252. The skirt 252 includes, on its inner surface, a second wall portion 260. The second wall portion 260 includes a plurality of grooves 262 which interlock with the threads 233 on the first wall portion 232 and thereby function as another locking member.

An additional locking member 264 is included as part of the skirt 252. The locking member 264 is in the form of inwardly extending flexible serrations engageable with the first locking member 234. The serrations 264 project from the back face of a wall portion 266 having a diameter slightly larger than the diameter of the wall 256. The wall portion 266, as shown in FIG. 7, has a greater height than does the wall 256. The wall portion 266 is connected to the skirt 252 by a ledge 268 and by vertically and horizontally extending rupture zones, or lines 270. The lines 270 essentially are areas of reduced material thickness (approximately 0.008 inch). The ledge 268 includes an opening 272 to enable the serrations 264 to be formed expeditiously in a molding operation. A tab 274 extends outwardly from the lower portion of the wall 266. Upon upward flexure of the tab 274, the rupture lines 270 will fail and the wall section 266 will be pivoted upwardly.

During initial attachment of the closure cap 200 to the container 220, the cap 200 is placed atop the neck portion 224 and is threaded onto the neck portion 224. As the cap 200 is threaded, the rim 246 eventually engages the rim 228 to effect a fluid-tight seal. The engagement between the rim 246 and the rim 228 may be referred to as a primary seal. The interlocking threads and grooves 233, 262 of the wall portions 232, 260 create a secondary seal. The rim 258 and the ledge 226 engage each other in substantial line-to-line contact to create a tertiary seal. The lowermost portion of the wall 256 also engages the ledge 227 in substantial surface-to-surface contact to create yet a fourth seal. After the cap 200 is in that position illustrated in the figures, the container 220 will be sealed and the cap 200 cannot be removed because of the engagement of the interlocking serrations 234, 264.

In order to remove the closure cap 200 from the container 220, the tab 274 is lifted upwardly until the rupture zones 270 fail. At that point, the hoop strength in the wall 256 is released. Also, because the serrations 264 no longer engage the serrations 234, a locking function no longer is carried out by the serrations 264, 234. Accordingly, the cap 200 can be unthreaded from the container 220. Because the wall portion 266 essentially is only a circumferential portion of the wall 256 and not the remainder of the skirt 252, the skirt 252 will not be expanded upon retightening the cap 200 so as to disengage the threads 233 and the grooves 262. Furthermore, the cap 200 can be removed and replaced as often as desired without adversely affecting the seal created by the rims 246, 228, and the rim 258 and the ledge 226. Because the tab 274 and the wall portion 266 can be readily observed by a consumer, it will be immediately apparent whether the cap 200 has been tampered with or removed from the container 220. Moreover, the closure cap 200 according to the invention is relatively easy to open because the tap 274 can be grasped without difficulty, and there is no need to dispose of a severed portion of the cap 200.

In addition to the advantages of the invention described previously, it will be appreciated that each embodiment of the invention can be formed expeditiously in a molding operation. In particular, unlike certain prior caps, the vertically extending rupture lines can be molded easily to close tolerances and the cap according to the invention can be removed quickly from a mold even while still in a softened condition. In part, this is because forces required to remove the cap from the mold are exerted in the direction of the rupture lines, rather than laterally of the rupture lines.

Although the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A closure cap for sealing the neck portion of a container such as a milk bottle, the neck portion having an upstanding annular rim, a first outer wall portion depending therefrom and having threads thereon and further having a recess thereon, the closure cap being formed of a material having limited flexibility and comprising:
   (a) a disc-like top wall engageable with the rim to effect a substantially fluid-tight seal;
   (b) an annular skirt depending from the top wall, the skirt having on its inner periphery:
      (i) helical threads configured to mate with the threads on the first outer wall portion of the container neck to secure the closure cap to the bottle, the threads cooperating to form a second substantially, fluid-tight seal;
      (ii) a radially inwardly projecting tooth for cooperative reception within the recess of the outer wall portion when the closure cap is fully threaded onto the container, the tooth having a configuration precluding axial vertical movement thereof in response to relative unthreading movement of the cap; and,
      (iii) a pair of spaced generally vertically extending rupture zones on either side of the tooth, the rupture zones extending from the lowermost extremity of the skirt to points generally adjacent the closure disc;
   (c) a tab projecting laterally outwardly of the skirt from a location near the lower edge thereof, the tab being disposed between the vertically extending rupture zones whereby, upon upward flexure of the tab, the rupture zones will fail and permit the lower skirt area therebetween to be hinged radially outwardly to withdraw the tooth from the recess and permit unthreading removal of the closure cap from the neck of the container, the limited flexibility of the cap material permitting substantial cooperation of the threads notwithstanding rupture of the skirt wall along the rupture lines, where the cap may thereupon be releasably resecured to the container by the threads with the closure disc effecting the first seal to preclude leakage;
   (d) the recess on the outer wall portion of the container neck including an upper wall surface which extends substantially normal to the axis of the container neck; and,
   (e) the closure cap tooth including a flat upper surface for reception in said recess against the upper wall surface thereof, the tooth further having a camming surface thereon to permit minimal deflection of said skirt thereon outwardly as said closure cap is threaded onto the container neck portion prior to the reception of the tooth in the recess.

2. The closure cap of claim 1 wherein:
   (a) the container neck portion further includes a second outer wall portion beneath the first outer wall portion and having a generally upwardly facing annular surface; and,
   (b) the closure cap further includes an annular rim at the lower extremity of said skirt for cooperative engagement with said second outer wall portion of said container neck thereby to form a third fluid-tight seal when said cap is assembled upon said container to preclude contamination attack of the first and second seals.

3. The closure caps of claim 1 wherein the disc-like top wall includes an annular inwardly extending flexible lip for cooperation with said annular rim of the bottle neck portion in forming said first seal.

4. The closure cap of claim 1 wherein the outer wall portion recess is disposed axially below the outer wall portion threads and the tooth is located on the skirt adjacent the lowermost extremity thereof and below said threads thereon.

5. A closure cap for sealing the neck portion of a container such as a milk bottle, the neck portion having an upstanding annular rim, a first outer wall portion depending therefrom and having threads thereon and further having a recess thereon, the closure cap being formed of a material having limited flexibility and comprising:
   (a) a disc-like top wall engageable with the rim to effect a substantially fluid-tight seal;
   (b) an annular skirt depending from the top wall, the skirt having on its inner periphery:
      (i) helical threads configured to mate with the threads on the first outer wall portion of the container neck to secure the closure cap to the bottle, the threads cooperating to form a second substantially fluid-tight seal;
      (ii) a radially inwardly projecting tooth for cooperative reception within the recess of the outer wall portion when the closure cap is fully threaded onto the container, the tooth having a configuration precluding axial vertical movement thereof in response to relative unthreading movement of the cap; and,
      (iii) a pair of spaced generally vertically extending rupture zones on either side of the tooth, the rupture zones extending from the lowermost extremity of the skirt to points generally adjacent the closure disc;
   (c) a tab projecting laterally outwardly of the skirt from a location near the lower edge thereof, the tab being disposed between the vertically extending rupture zones whereby, upon forward flexure of the tab, the rupture zones will fail and permit the lower skirt area therebetween to be hinged radially outwardly to withdraw the tooth from the recess and permit unthreading removal of the closure cap from the neck of the container, the limited flexibility of the cap material permitting substantial cooperation of the threads notwithstanding rupture of the skirt wall along the rupture lines, where the cap may thereupon be releasably resecured to the container by the threads with the closure disc effecting the first seal to preclude leakage;
   (d) the recess on the outer wall portion of the container neck including an upper wall surface which extends substantially normal to the axis of the container neck; and,
   (e) the closure cap tooth including a flat upper surface for reception in said recess against the upper wall surface thereof, the tooth further having a camming surface thereon to permit minimal deflection of said skirt thereon outwardly as said closure cap is threaded onto the container neck portion prior to the reception of the tooth in the recess;
   (f) the container neck portion further including a second outer wall portion beneath the first outer wall portion and having a generally upwardly facing annular surface;
   (g) the closure cap further including an annular rim at the lower extremity of said skirt for cooperative engagement with said second outer wall portion of said container neck thereby to form a third fluid-tight seal when said cap is assembled upon said container to preclude contamination attack of the first and second seals;

(h) the disc-like top wall including an annular inwardly extending flexible lip for cooperation with said annular rim of the bottle neck portion in forming said first seal;

(i) the outer wall portion recess being disposed axially below the outer wall portion threads; and, (j) the tooth being located on the skirt adjacent the lowermost extremity thereof and below said threads thereon.

* * * * *